US006789253B1

(12) United States Patent
Streich et al.

(10) Patent No.: US 6,789,253 B1
(45) Date of Patent: Sep. 7, 2004

(54) METHOD, SYSTEM, AND APPARATUS TO IMPROVE PERFORMANCE OF MULTI-THREADED COMPUTER PROGRAMS

(75) Inventors: Mark Streich, Fremont, CA (US); Salil Pradhan, Santa Clara, CA (US); Eric Caspole, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/363,067

(22) Filed: Jul. 28, 1999

(51) Int. Cl.[7] .............................. G06F 9/45; G06F 9/44; G06F 12/00; G06F 9/46
(52) U.S. Cl. ...................... 717/138; 717/118; 717/139; 711/152; 718/102
(58) Field of Search ................................ 717/127, 132, 717/138, 145, 148, 149, 154, 118, 139; 711/111, 112, 152; 718/102

(56) References Cited

U.S. PATENT DOCUMENTS

| | | | | |
|---|---|---|---|---|
| 5,088,036 A | * | 2/1992 | Ellis et al. | 707/206 |
| 5,594,904 A | * | 1/1997 | Linnermark et al. | 717/124 |
| 5,842,016 A | * | 11/1998 | Toutonghi et al. | 709/106 |
| 6,289,360 B1 | * | 9/2001 | Kolodner et al. | 707/206 |
| 6,301,704 B1 | * | 10/2001 | Chow et al. | 717/146 |
| 6,341,293 B1 | * | 1/2002 | Hennessey | 707/206 |
| 6,446,257 B1 | * | 9/2002 | Pradhan et al. | 717/154 |

OTHER PUBLICATIONS

Lindholm–Yellin, The Java Machine Specification, Sep. 1996, Addison–Wesley Pub. Co.*
Bogda–Hozle, Removing Unnecessary Synchronization in Java, Sep. 1999, ACM, 1999.*
Bacon–Konuru–Murphy–Serrano, Thin Locks: Featherweight Synchronization for Java, Jun. 1998, SIGPLAN Notices, vol. 33, No. 6.*
Doug Lea, "Concurrent Programming in Java—Java Concurrency Support": pp. 8–9, 17, 36, 39, and 267.

* cited by examiner

Primary Examiner—Antony Nguyen-Ba

(57) ABSTRACT

A method, system, and apparatus for improving performance of multi-threaded computer programs that re-establishes the lock structure that enables access to a portion of the computer memory and thereby reduces contention for computer memory. The present invention analyzes the references to computer memory and re-structures the memory access lock structure and thereby improves the use of regions of computer memory that are found to be mutually exclusive.

20 Claims, 7 Drawing Sheets

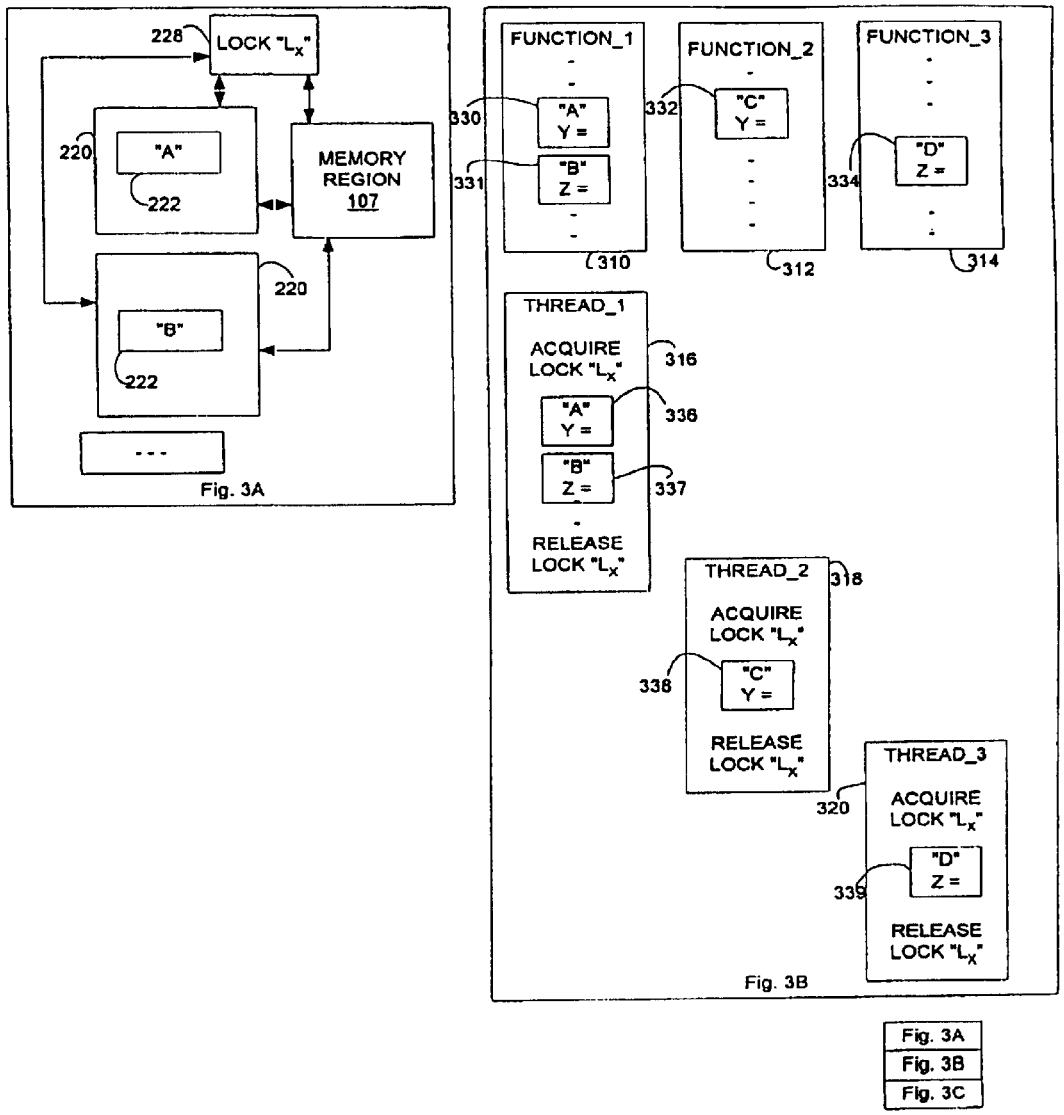

METHOD, SYSTEM, AND APPARATUS TO IMPROVE PERFORMANCE OF MULTI-THREADED COMPUTER PROGRAMS

FIELD OF THE INVENTION

The present invention relates generally to a method and apparatus for improving performance of multi-threaded computer programs by reducing contention for computer memory. More particularly the present invention re-establishes the lock structure used by multi-threaded computer programs to enable greater resolution of the region of memory that is associated with the lock structure.

BACKGROUND OF THE INVENTION

Compiler systems operating in a computer system typically access computer resources such as computer memory. One method of computer resource access is threads-based programming that operates with a compiler system to enable an activity generated by program code to proceed asynchronously with respect to other activities executing in the computer system.

It will be appreciated that the term "thread" refers to a linear control flow of an executing program, and in a multi-threaded environment several paths in an executing program may be executing simultaneously. Threads may be programmed to execute sequentially or concurrently. Many computer systems include multiple processors and therefore concurrent execution of threads-based programs may take advantage of the hardware concurrence built into computer systems that include multiple processors. The concurrent operation of a threads-based program creates the need to safeguard the state of variables associated with the threads-based program while the threads-based program is accessing computer memory.

When multiple threads are dependent each thread may send messages to objects or processes that are associated with the other threads. A consistent state may be maintained for the variables in an object or process associated with a thread by methods such as, synchronizing the operations of associated threads or safeguarding the operations associated with the threads. It will be appreciated that safeguarding may be accomplished by structural exclusion techniques. The term "state" as used herein refers to the value associated with a variable that is maintained in a consistent manner.

Shared computer memory is accessible by two or more threads. Therefore, multi-threaded programs acquire access to portions of the computer memory in order to execute the threaded instructions in the appropriate sequence. Typically, a lock structure is created by the compiler system to ensure that access to a region, or portion, of the computer memory is safeguarded. It would be advantageous if the lock structure used for safeguarding were re-structured based on the references to a portion of the memory and not on the process of execution of the code block. Thereby the lock structure would enable greater resolution of the region of the memory that is locked and less contention for access to computer memory than in the past.

SUMMARY OF THE INVENTION

The present invention is a method and apparatus for improving performance of multi-threaded computer programs by reducing contention for computer memory. More particularly, the present invention re-establishes the lock structure that enables access to a portion of the computer memory.

Many compilation systems include operations to improve performance of programs that may include multi-threaded operations. The present invention extends the capabilities of a compilation system by analyzing the references to computer memory and thereby improves the use of regions of computer memory that are found to be mutually exclusive. Therefore, the present invention may operate in cooperation with a compilation system that may include an interpreter, an emulator such as the product marketed under the trademark JAVA Virtual Machine,™ a run-time compiler, or any other operation that accesses computer memory. More particularly the present invention advantageously re-establishes a lock structure that may be used with threads-based programs to safeguard regions of computer memory.

Accordingly it is an object of the invention to determine the computer-based operation that the locks are safeguarding and to re-establish a lock structure based on the reference to the memory made by the safeguarded operation. For example, the product marketed under the trademark JAVA™ operates to manage information about the region of the computer memory that is accessed during the execution of a software program. The present invention takes advantage of that operation. More particularly, the present invention may analyze a critical code block to determine the region of the memory accessed by the critical code block and may re-establish access and safeguarding of the memory based on the reference made by the operation to the memory.

It will be appreciated that a critical code block is a subset of a code block. The term "code block" as used herein refers to a sequence of instructions that execute on a computer system and threads-based program code may operate on a code block. The term "critical code block" as used herein refers to a sequence of instructions that begins with the code that is associated with the acquisition of a lock and ends with the code that is associated with the release of the lock.

It is an object of the invention to re-establish the access by a threads-based program to a lock via reference to the memory. In the past access by a threads-based program to a lock was based on access to information about the process of execution of the critical code block associated with the thread.

It is also an object of the present invention to enable greater sharing of the computer memory by a more efficient access to the computer memory than in the past. It will be appreciated that efficient access to the computer memory is achieved when concurrent access to the memory is enabled. Therefore, by re-structuring a lock based on reference to a portion of the memory the present invention retains a lock on a portion of the memory for a shorter duration than in the past and enables concurrent access of various portions of the memory.

The present invention determines the computer-based operation that the locks are safeguarding and re-establishes a lock structure based on the operations that are being safeguarded. More particularly, the present invention analyzes a critical code block to determine the region of the memory accessed by the critical code block and re-establishes access and safeguarding of the memory based on the operation related to the memory access. That is, the present invention re-establishes access by a threads-based program to a lock based reference to the memory. Thereby the present invention enables greater sharing of the computer memory by a more efficient access to the computer memory than in the past.

Other aspects and advantages of the present invention will become apparent from the following detailed description,

BRIEF DESCRIPTION OF THE DRAWINGS

The accompanying drawings are incorporated in and constitute a part of this specification and, together with the description, explain the advantages and principles of the invention. In the drawings.

FIG. 3A is a block diagram that illustrates the association of a lock to a memory region and a critical code block;

FIG. 3B is a block diagram that illustrates an operation of locking that is associated with threads-based programs;

DETAILED DESCRIPTION

Figure 1A:
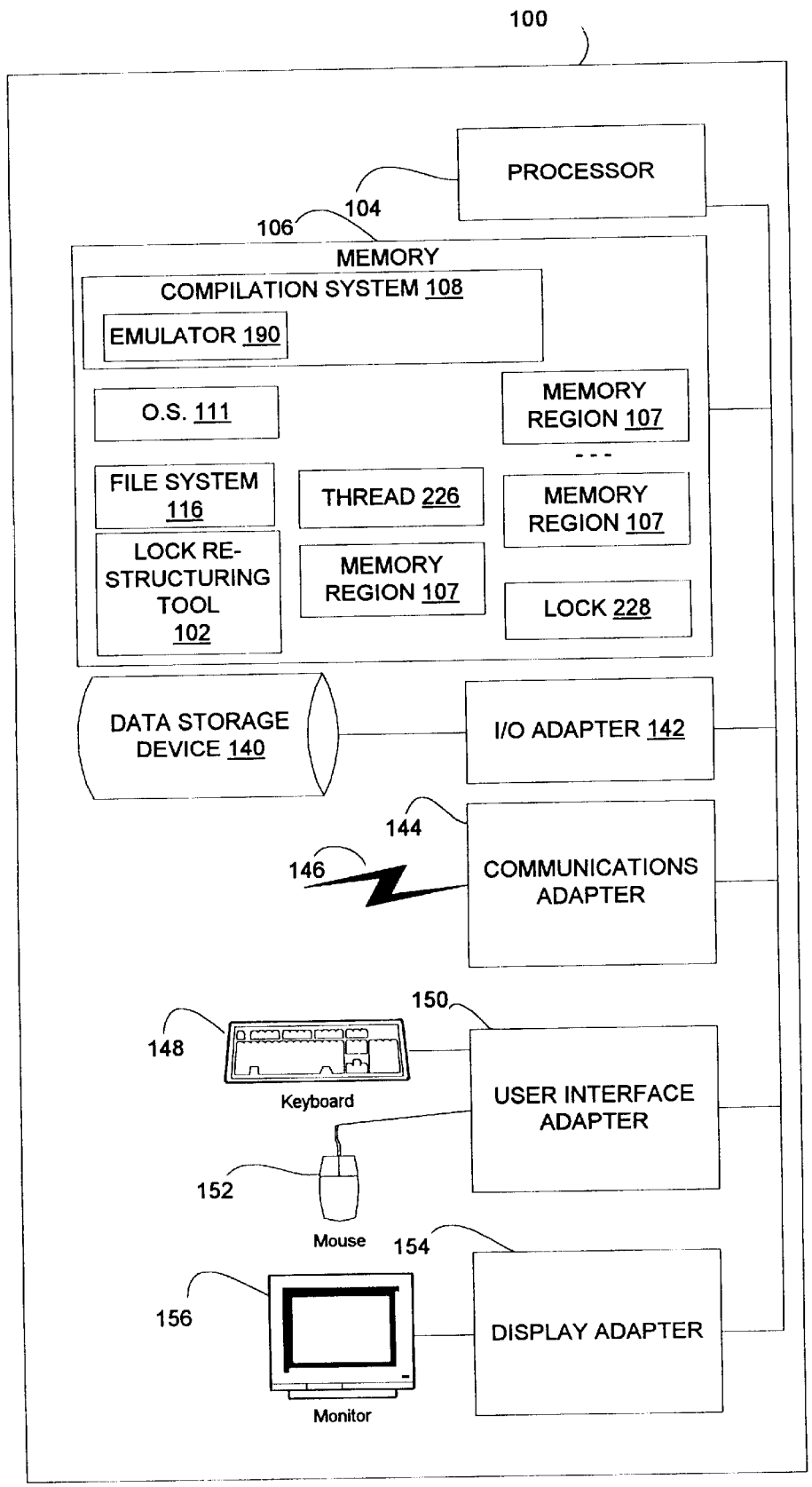
FIG. 1A is a block diagram that illustrates a computer system including the lock re-structuring tool.

In the following detailed description and in the several figures of the drawings, like elements are identified with like reference numerals.

Figure 2:
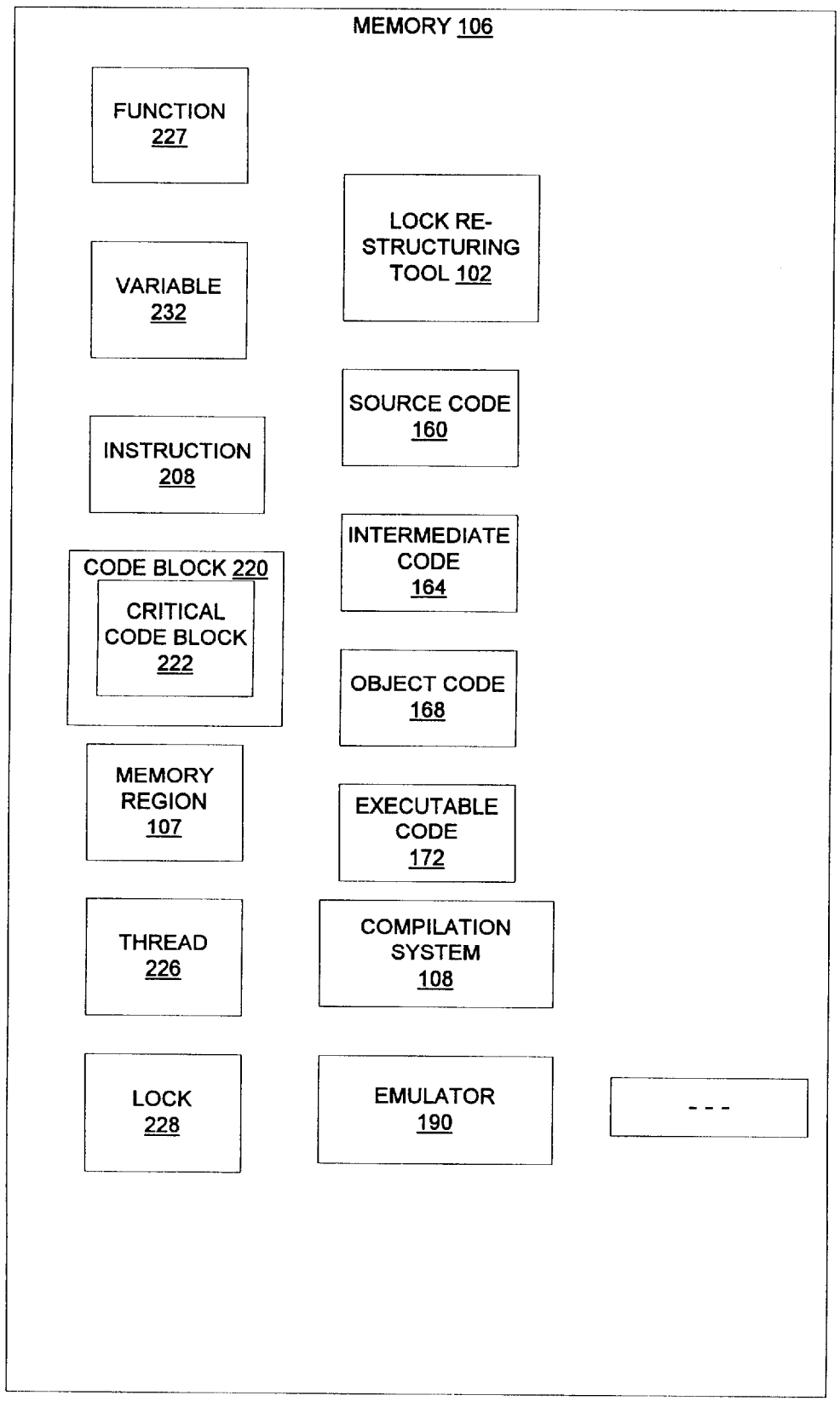
FIG. 2 is a block diagram that illustrates the memory including data structures and functions of the computer system and those used by the lock re-structuring tool.

Broadly stated, FIG. 1A illustrates a lock re-structuring tool 102 that operates in a computer system 100 and that re-structures access to computer memory via programs that include threads 226 (as shown in FIG. 2). It will be appreciated that source programs that include threads 226 execute on the computer system 100 and reference the computer memory 106 to obtain information necessary to ensure the appropriate sequence of instruction execution.

The present embodiment preserves the state of variables 232 associated with a process or an object associated with a thread 226. More particularly, the present embodiment ensures that variables 232 (as shown in FIG. 2) associated with a threads-based process or object and the variables 232 associated with other threads-based processes or objects that depend on the first variable 232 possess meaningful and consistent values. A lock structure 228 (as shown in FIG. 2) is created by the compilation system 108 to ensure that access to a portion of the computer memory 106 by a threads-based program is safeguarded. It will be appreciated that the terms "lock" and "lock structure" will be used interchangeably herein. The present embodiment novelly operates to re-establish the lock structure 228 based on the operations associated with referencing memory regions 107 and thereby maintains a consistent state of the variables 232 associated with a process or object.

A "thread" as used herein is a programming structure that ensures execution of a critical code block 222 (as shown in FIG. 2) in a specified sequence. A "process" is a programming structure that maintains its own set of resources while executing, and a thread 226 uses the resources of the associated process. Therefore, critical code blocks 222 in a process can operate concurrently in a threads-based programming structure.

Alternatively, a thread 226 may operate in an object-oriented programming environment and may be associated with an object. It will be appreciated that the term "object" as used herein is a process in which the data associated with the process helps to determine the operation of the process. Threads-based programming is discussed with reference to *Concurrent Programming in JAVA*, ™Doug Lea, 1996.

The lock re-structuring tool 102 includes instructions 208 (as shown in FIG. 2) and data. Those skilled in the art will appreciate the use of instructions 208 and data in a computer system 100. For instance, an instruction 208 may represent a computer address that may be a computer hardware register or a location in the memory 106.

FIG. 1A further represents the computer system 100 that includes components such as a processor 104, the memory 106, a data storage device 140, an input/output (I/O) adapter 142, a communications adapter 144, a communications network 146, a user interface adapter 150, a keyboard 148, a mouse 152, a display adapter 154, and a computer monitor 156. It will be understood by those skilled in the relevant art that there are many possible configurations of the components of the computer system 100 and that some components that may typically be included in the computer system 100 are not shown.

It will be understood by those skilled in the art that the functions ascribed to the lock re-structuring tool 102, or any of its functional files, typically are performed by a central processing unit that is embodied in FIG. 1A as the processor 104 executing such software instructions 208.

The processor 104 typically operates in cooperation with other software programs such as the compilation system 108, the operating system (O.S.) 111, and the lock re-structuring tool 102. Henceforth, the fact of such cooperation among the processor 104 and the lock re-structuring tool 102, whether implemented in software, hardware, firmware, or any combination thereof, may therefore not be repeated or further described, but will be implied. The lock re-structuring tool 102 may operate under the control of the O.S. 111.

The O.S. 111 may cooperate with a file system 116 that manages the storage and access to files within the computer system 100. Files typically include instructions 208 and data. The interaction between the file system 116 and the O.S. 111 will be appreciated by those skilled in the art.

It will also be understood by those skilled in the relevant art that the functions ascribed to the lock re-structuring tool 102 and its functional files, whether implemented in software, hardware, firmware, or any combination thereof, may in some embodiments be included in the functions of the O.S. 111. That is, the O.S. 111 may include files from the lock re-structuring tool 102. In such embodiments, the functions ascribed to the lock re-structuring tool 102 typically are performed by the processor 104 executing such software instructions 208 in cooperation with aspects of the O.S. 111 that incorporate the lock re-structuring tool 102. Therefore, in such embodiments, cooperation by the lock re-structuring tool 102 with aspects of the O.S. 111 will not be stated, but will be understood to be implied.

Computer memory 106 may be any of a variety of known memory storage devices or future memory devices, including any commonly available random access memory (RAM), cache memory, magnetic medium such as a resident hard disk, or other memory storage devices. Computer memory 106 may be partitioned into regions 107 that may be individually accessed. In one embodiment the O.S. 111 and the lock re-structuring tool 102 may reside in the memory 106 during execution in the computer system 100. The term "storage" refers herein to computer resources such as memory 106, and may be used to store data or instructions 208 used in executing a computer program.

The compilation system 108 and the O.S. 111 may also reside in the memory 106 when the lock re-structuring tool 102 is operating. Further, the compilation system 108 may operate in cooperation with the O.S. 111 to execute the lock re-structuring tool 102. That is, the present embodiment may employ the compilation system 108 to resolve any system-specific information such as address locations that are necessary to execute the lock re-structuring tool 102 in the computer system 100.

It will be appreciated that "execute" refers to the process of manipulating software or firmware instructions 208 for operation on the computer system 100. The term "code" refers to instructions 208 or data used by the computer system 100 for the purpose of generating instructions 208 or data that execute in the computer system 100. Also, the term "function" 227 (as shown in FIG. 2) may refer to a software "procedure" such as a unit of code that may be independently compiled. A "program" contains software program code, may contain at least one function 227, and may be independently compiled and executed. The term "compile-time" refers to the period of compilation before a computer program is loaded and executing on the computer system, and the term "run-time" refers to the period of compilation after the computer program is loaded and is able to execute on the computer system.

Figure 1B:
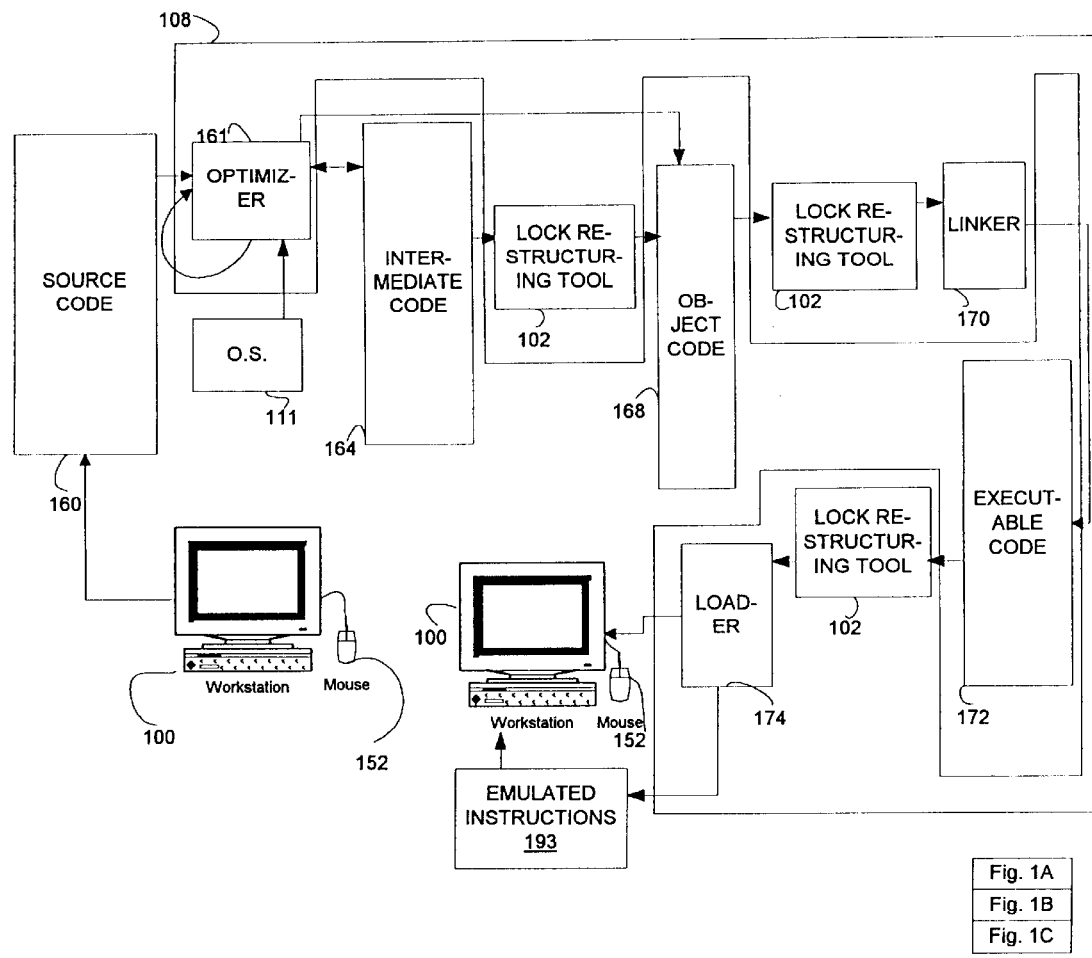
FIG. 1B is a block diagram that illustrates a form of compiler technology that operates with the lock re-structuring tool.
Figure 1C:
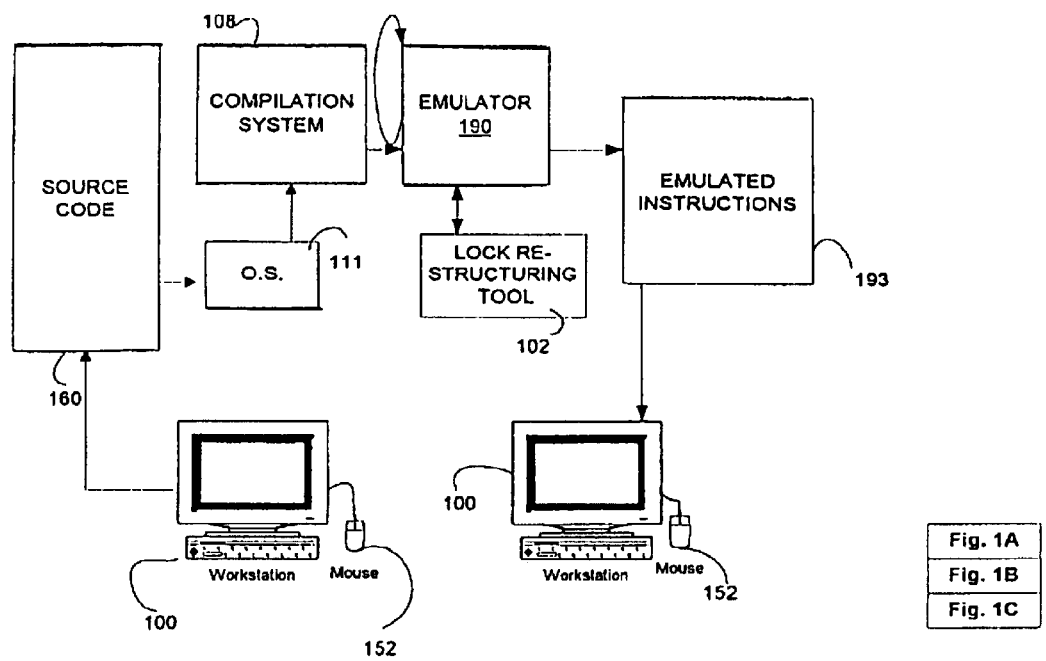
FIG. 1C is a block diagram that illustrates a form of emulator technology that operates with the lock re-structuring tool.

It will be appreciated that an emulator 190 (as shown in FIG. 1C) may be included in the computer system 100. An emulator 190 substitutes instructions 208 typically associated with a different computer system 100 than the executing computer system 100, for the original instructions 208. It will be appreciated that the substituted instructions 208 may be associated with a hardware, software, or firmware representation of a different computer system 100.

The lock re-structuring tool 102 may be implemented in the "C" programming language, although it will be understood by those skilled in the relevant art that other programming languages could be used. Also, the lock re-structuring tool 102 may be implemented in any combination of software, hardware, or firmware.

The data storage device 140 may be any of a variety of known or future devices, including a compact disk drive, a tape drive, a removable hard disk drive, or a diskette drive. Any such program storage device may communicate with the I/O adapter 142, that in turn communicates with other components in the computer system 100, to retrieve and store data used by the computer system 100. As will be appreciated, such program storage devices typically include a computer usable storage medium having stored therein a computer software program and data.

Input devices could include any of a variety of known I/O devices for accepting information from a user, whether a human or a machine, whether local or remote. Such devices include, for example a keyboard 148, a mouse 152, a touch-screen display, a touch pad, a microphone with a voice recognition device, a network card, or a modem. The input devices may communicate with a user interface I/O adapter 142 that in turn communicates with components in the computer system 100 to process I/O commands. Output devices could include any of a variety of known I/O devices for presenting information to a user, whether a human or a machine, whether local or remote. Such devices include, for example, the computer monitor 156, a printer, an audio speaker with a voice synthesis device, a network card, or a modem. Output devices such as the monitor 156 may communicate with the components in the computer system 100 through the display adapter 154. Input/output devices could also include any of a variety of known data storage devices 140 including a compact disk drive, a tape drive, a removable hard disk drive, or a diskette drive.

By way of illustration, program code may typically be loaded through an input device and may be stored on the data storage device 140. A copy of the code or portions of it, may alternatively be placed by the processor 104 into the memory 106 for execution on the computer system 100.

The computer system 100 may communicate with the network 146 through a communications adapter 144, such as a networking card. The network 146 may be a local area network, a wide area network, or another known computer network or future computer network. It will be appreciated that the I/O device used by the lock re-structuring tool 102 may be connected to the network 146 through the communications adapter 144 and therefore may not be co-located with the computer system 100. It will be further appreciated that other portions of the computer system 100, such as the data storage device 140 and the monitor 156, may be connected to the network 146 through the communications adapter 144 and may not be co-located.

As shown in FIG. 1B the present embodiment is a form of compiler technology that may use software source code 160 that is generated from input computer system 100 I/O devices such as a keyboard 148 (as shown in FIG. 1A) and a mouse 152. It will be appreciated that the present embodiment operates on any multi-purpose computer system 100 and is not limited to the illustration herein. A software developer may create source code 160 typically in a high-level programming language such as "C." The computer system 100 may manage the processing of the source code 160 through the O.S. 111. The O.S. 111 may direct the processing of the source code 160 by a compiler optimizer 161 that may generate intermediate code 164 from the source code 160. The intermediate code 164 typically is a list of intermediate-level language instructions 208. The optimizer 161 may optimize code while preserving the structure and sequence of source operations. For instance, the optimizer 161 may optimize array contents while retaining the array accesses in the source code 160. If the code semantics can be preserved, the optimizer 161 may move instructions 208 to ensure optimal execution of frequently used instructions 208.

The present embodiment may operate in a traditional compilation system by processing intermediate code 164. That is, if the intermediate code 164 includes information about the lock structure 228 (as shown in FIG. 2), such as monitor structures that analyze and use resources of the computer system 100 including the memory 106, the present embodiment may re-establish the lock structure 228 to enable greater parallel access to the memory 106 and therefore greater parallel execution than in the past.

The optimizer 161 may generate object code 168 that includes optimization changes which may be dependent on the particular multi-purpose computer system 100 on which the compiler optimizer technology operates. These machine-specific changes may allow the optimizer 161 to generate code that is highly tailored to optimally run on a specific multi-purpose computer system 100; for example code may be tailored to support different cache organizations or a different number of computer processors 104 (as shown in FIG. 1A). The lock re-structuring tool 102 may operate on object code 168 to re-establish the lock structure 228 based on references to memory regions 107 (as shown in FIG. 1A) in the object code 168.

In the present embodiment the linker 170 may operate on the output of the optimizer 161 which may be object code 168. In order to execute the object code 168 it is combined with one or more object code modules to create combined user process executable code 172 by a process known as linking. The present embodiment may employ a linker 170 to resolve any undefined computer location references in the object code 168 and to generate executable code 172 capable of executing on an output multi-purpose computer system 100 with I/O devices such as a keyboard 148 and a mouse 152. It will be appreciated that the input computer system 100 and the output computer system 100 may be the same computer system 100 and are not limited to the configuration illustrated.

In the present embodiment the executable code 172 may be formatted to enable a loader 174 to load the executable code 172 into the computer system 100 for execution. The executable code 172 may be any of a variety of known executable files or an executable file of a type to be developed in the future. Examples of such known files are those having an extension of ".exe" operating under a DOS or Windows operating system or an "a.out" file of a UNIX® operating system. Alternatively the loader may generate emulated instructions 193 that operate on a different computer system 100 than the executing computer system 100. The lock re-structuring tool 102 may operate on executable code 172 to re-establish the lock structure 228 based on references to memory regions 107 (as shown in FIG. 1A) in the executable code 172.

It will be appreciated that typically the compilation system 108 may include the optimizer 161, the linker 170, and the loader 174. The lock re-structuring tool 102 may also be included in the compilation system 108 and may operate with intermediate code 164, object code 168, or executable code 172 to re-establish a lock structure 228.

FIG. 1C is a block diagram that illustrates the operation of the lock re-structuring tool 102 that operates in coordination with an emulator 190, such as the product marketed under the trademark JAVA Virtual Machine.™ Source code 160 typically is loaded through an input device and may be stored on the data storage device 140 (as shown in FIG. 1A). A copy of the source code 160 or portions of it, may alternatively be placed by the processor 104 into the memory 106 (as are shown in FIG. 1A) for execution on the computer system 100. The O.S. 111 may operate to associate the source code 160 with the compilation system 108 that may generate code for use by the emulator 190.

Further, the lock re-structuring tool 102 may operate to generate a re-established lock structure 228 that may be used by the emulator 190. The emulator 190 may then operate, typically in an iterative manner, to create emulated instructions 193 for the original instructions 208. Typically the emulated instructions 193 are associated with a different computer system 100 than the executing computer system 100.

FIG. 2 illustrates data structures and functions 227 used by the lock re-structuring tool 102 that may be stored in the memory 106. The memory 106 may include the following: a lock re-structuring tool 102 that re-establishes the lock structure 228 that safeguards the state of variables 232;

a function 227 that is a unit of code that may be independently compiled;

a variable 232 that is an identifier for a value;

instructions 208 that are operating directives of the computer system 100;

a code block 220 that is a sequence of instructions 208 that execute on a computer system 100 (as shown in FIG. 1A);

a critical code block 222 that is a portion of the code block 220 that includes instructions 208 that must be executed in a stipulated sequence, and is a region of mutual exclusion with respect to other critical code blocks 222;

a memory region 107 that may be considered a region of data and that is associated with a critical code block 222;

a thread 226 that is a computer-based structure that maintains a linear control of flow of an executing program and may obtain a lock 228 for mutual exclusion of critical code blocks 222;

a lock 228 that is a computer-based structure that ensures that access to a region of the computer memory 107 by a thread 226 is safeguarded;

a compilation system 108 that translates program code into instructions 208 that operate on the computer system 100;

an emulator 190 that substitutes instructions 208 typically associated with a different computer system 100 than the executing computer system 100;

source code 160 that is manipulated by a computer system 100 and that is typically written in a high-level programming language such as "C;"

intermediate code 164 that is a list of intermediate-level language instructions 208;

object code 168 that includes optimization changes which may be dependent on the particular multi-purpose computer system 100 on which the compilation system 108 operates;

executable code 172 that is capable of executing on a multi-purpose computer system 100;

as well as other data structures and functions 227.

FIG. 3A is a block diagram that illustrates the association of a lock 228 to a memory region 107 and a critical code block 222. Recall that multi-threaded programs use regions of mutual exclusion that may be referred to herein as "critical code blocks" 222 that ensure serial access to associated variables 232 (as are shown in FIG. 2) that may be stored in a memory region 107. That is, a critical code block 222 is a region of mutual exclusion with respect to other critical code blocks 222. Further, critical code blocks 222 are code blocks 220 with at least one thread 226 that controls the sequence of execution of instructions 208 (as are shown in FIG. 2), and the sequence of instructions 208 must be executed in a stipulated fashion.

By means of example Table 1 is a sequence of code that illustrates a critical code block 222. Therefore as shown in Table 1 at line 1 "x=10" and at line 2 "y=20." If the variables 232 labeled "x" and "y" are located in a memory region 107 that is shared among two or more threads 226 (as shown in FIG. 2) the code sequence that uses the variables 232 labeled "x" and "y" will be a critical code block 222, and the state of the variables 232 labeled "x" and "y" may be safeguarded by a lock structure 228. Therefore, in the present example, lines 1–3 are a critical code block 222. Further, as shown at line 4, if the variable 232 labeled "z" is not shared among two or more threads 226 it may be a local variable 232 and will not be protected within a critical code block 222.

TABLE 1

| | |
|---|---|
| x = 10 | line 1 |
| y = 20 | line 2 |
| z = x + y | line 3 |
| print z | line 4 |

The present embodiment advantageously re-establishes a lock structure 228 based on the references to the memory 106 that are associated with the safeguarded critical code block 222, and does not require information about the process of execution of the critical code block 222. The re-established lock structure 228 safeguards the state of the variables 232 associated with the critical code block 222. That is reference to a memory region 107 determines the lock structure 228 according to the present embodiment and not information about the process of execution of the critical code block 222.

Some computer languages have built in support for managing critical code blocks 222 through keywords or other language structures. For example, in the language marketed under the trademark JAVA™ there are mechanisms that support the locking of objects. Threads 226 therefore may obtain a lock 228 for mutual exclusion of critical code blocks 222 by using special machine instructions 208 or by functions 227 (as shown in FIG. 2) associated with the O.S. 111 (as shown in FIG. 1A). However, these convenient mechanisms may not be the most efficient mechanisms for managing access to a memory region 107. The present embodiment enables efficient use of the memory 106 by novelly re-establishing a lock structure 228 based on reference to a memory region 107.

Synchronization ensures that variables 232 associated with a process or object that may change state or value undergo these changes in a consistent manner. For example, accessing information about a variable 232 associated with a process or object that is undergoing change may result in an incorrect value being associated with the accessed information. Therefore, when a variable 232 associated with a process or object is undergoing change, synchronization ensures that the change will be completed before further access to the value is enabled. Further, when a variable 232 associated with a process or object undergoes multiple updates, synchronization ensures that the updates will be completed in a consistent manner. Therefore, in a threaded environment, when at least two threads 226 access the same variable 232, synchronization ensures that the threads will not interfere and create an inconsistent state or value of the variable 232.

Synchronization may be enabled by the use of a lock 228 that is associated with a critical code block 222. The lock 228 may be operated by a variety of implementations including operating the lock 228 as a counter. For example, when an operation associated with a critical code block 222 is active the lock 228 may be incremented and when the operation has completed the lock 228 may be decremented. Therefore, when the lock 228 count is zero the critical code block 222 is not currently locked. Thereby, an enabled lock 228 ensures mutual exclusion of operations that may attempt to operate on the same critical code block 222 simultaneously.

In the present embodiment and with reference to FIG. 3A the memory region 107 may be associated with a critical code block 222 labeled "A" and a critical code block 222 labeled "B." It will be appreciated that a critical code block 222 is a subset of a code block 220. The lock 228 labeled "$L_x$" is associated with the memory region 107 that is referenced by the critical code blocks 222 labeled "A" and "B." The lock 228 labeled "$L_x$" is also associated with the critical code block 222 labeled "A" and the critical code block 222 labeled "B." That is, the lock 228 labeled "$L_x$" acts as a gatekeeper between the critical code blocks 222 labeled "A" and "B" that reference the memory region 107.

FIG. 3B is a block diagram that illustrates the locking mechanism without the operation of the lock re-structuring tool 102. More particularly, the establishment of a lock structure 228 is determined by information about the process of execution of the critical code block 222. Therefore as shown in element 310 the function 227 labeled "Function_1" includes the critical code block 222 labeled "A" as shown in element 330, and the critical code block 222 labeled "B" as shown in element 331. As shown in element 312 the function 227 labeled "Function_2" includes the critical code block 222 labeled "C" as shown in element 332, and as shown in element 314 the function 227 labeled "Function_3" includes the critical code block 222 labeled "D" as shown in element 334. It will be appreciated that the function 227, the critical code block 222, the thread 226, and the lock 228 are described with reference to FIG. 2.

Further a lock 228 labeled "$L_x$" is associated with the thread 226 labeled "Thread_1" as shown in element 316. Therefore the lock 228 labeled "$L_x$" is acquired by the thread 226 labeled "Thread_1" and is not released until the critical code block 222 labeled "A" as shown in element 336 and the critical code block 222 labeled "B" as shown in element 337 have completed execution.

Then, as shown in element 318 the thread 226 labeled "Thread_2" acquires the lock 228 labeled "$L_x$" and the critical code block 222 labeled "C" as shown in element 338 is executed. Upon completion of the execution and release of the lock 228 labeled "$L_x$," as shown in element 318, the thread 226 labeled "Thread_3" acquires the lock 228 labeled "$L_x$." Then, the critical code block 222 labeled "D," as shown in element 339, is executed as shown in element 320. After completion of the execution, the lock 228 labeled "$L_x$" is released.

It will be appreciated that the two threads 226 labeled "Thread_2" and "Thread_3" will both attempt to obtain the lock 228 labeled "$L_x$" when it is released at the completion of the execution shown in element 316. Typically, the operation of the computer system 100, the O.S. 111, and the compilation system 108 may determine whether the thread 226 labeled "Thread_2" or the thread 226 labeled "Thread_3" obtains the lock 228 labeled "$L_x$" first. It will be appreciated that the compilation system 108 may cooperate with an emulator 190 to determine whether the thread 226 labeled "Thread_2" or the thread 226 labeled "Thread_3" obtains the lock 228 labeled "$L_x$" first. The computer system 100, the O.S. 111, the compilation system 108, and the emulator 190 are described with reference to FIG. 1A.

Figure 3C:
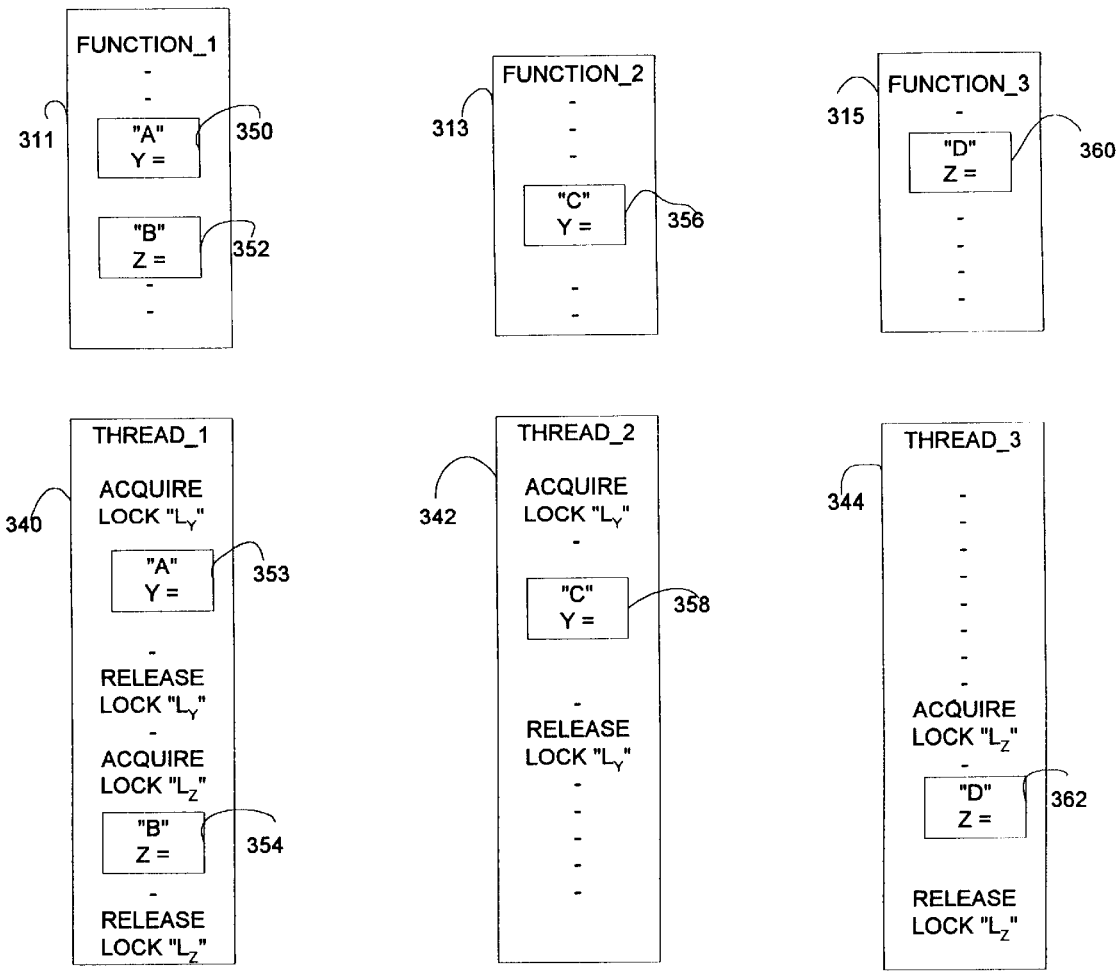
FIG. 3C is a block diagram that illustrates the operation of locking that is associated with the lock re-structuring tool.

FIG. 3C is a block diagram that illustrates the present embodiment of the lock re-structuring tool 102 (as shown in FIG. 2). Therefore as shown in element 311 the function 227 labeled "Function_1" includes the critical code block 222 labeled "A" as shown in element 350 and the critical code block labeled "B" as shown in element 352. As shown in element 313 the function 227 labeled "Function_2" includes the critical code block 222 labeled "C" as shown in element 356, and as shown in element 315 the function 227 labeled "Function_3" includes the critical code block 222 labeled "D" as shown in element 360. It will be appreciated that the function 227, the critical code block 222, the thread 226, the variable 232, and the lock 228 are described with reference to FIG. 2.

In the present example, the variables 232 labeled "Y" and "Z" are referenced from a shared memory region 107 (as shown in FIG. 1A). Advantageously the present embodiment recognizes that the variable 232 labeled "Y" may reference a different shared memory region 107 than that referenced by the variable 232 labeled "Z." The present embodiment re-establishes the lock structure 228 so that as shown in element 340 the thread 226 labeled "Thread_1"0 is associated with the lock 228 labeled "$L_Y$." Therefore the lock 228 labeled "$L_Y$" is released when the critical code block 222 labeled "A," as shown in element 353, has completed execution. Further as shown in element 340 the lock 228 labeled "$L_Z$," is associated with the critical code block 222 labeled "B," as shown in element 354, and is acquired by the thread 226 labeled "Thread_1."

It will be appreciated that the lock structure 228 labeled "$L_Y$" and the lock structure 228 labeled "$L_Z$" may be independently acquired and released. Also the lock structures 228 labeled "$L_Y$" and "$L_Z$" replace the prior lock structure 228 "$L_X$" as described with reference to FIG. 3B. Thereby, the lock re-structuring tool 102 reduces contention for access to a memory region 107 by re-establishing a lock structure 228 associated with a smaller critical code block 222.

Further, as shown in element 342 the lock 228 labeled "$L_Y$" is associated with the critical code block 222 labeled "C," as shown in element 358, that is executing with the thread 226 labeled "Thread_2." Therefore, the lock 228 labeled "$L_Y$" is available for safeguarding the critical code block 222 labeled "C," as shown in element 358, when it has been released from the thread 226 labeled "Thread_1" as shown in element 340. It will be appreciated that under another process of execution the thread 226 labeled "Thread_2" may obtain the first access to the lock 228 labeled "$L_Y$." However, since the critical code block 222 labeled "A" as shown in element 353 and the critical code block 222 labeled "C" as shown in element 358 are both associated with safeguarding the variable 232 labeled "Y," the thread 226 labeled "Thread_1" and the thread 226 labeled "Thread_2" may not simultaneously acquire access to the lock 228 labeled "$L_Y$."

Finally as shown in element 344, the thread 226 labeled "Thread_3" acquires the lock 228 labeled "$L_Z$," as shown in element 362. It will be appreciated that the variable 232 labeled "Z" references the memory region 107 that is shared by the threads 226 labeled "Thread_1" and "Thread_3," and is safeguarded by the lock structure 228 labeled "$L_Z$." Further, the thread 226 labeled "Thread_1" is associated with the critical code block 222 labeled "B" that contains the variable 232 labeled "Z" as shown in element 354, and the thread 226 labeled "Thread_3" is associated with the critical code block 222 labeled "D" that includes the variable 232 labeled "Z" as shown in element 362. The threads 226 labeled "Thread_1" and "Thread_3" may not acquire the lock structure 228 labeled "$L_Z$," simultaneously. Therefore the present embodiment creates locks 228 that are associated with critical code blocks 222 that include a thread 226, and the creation of the locks 228 is based on reference to the memory region 107 associated with the critical code block 222.

Figure 4:
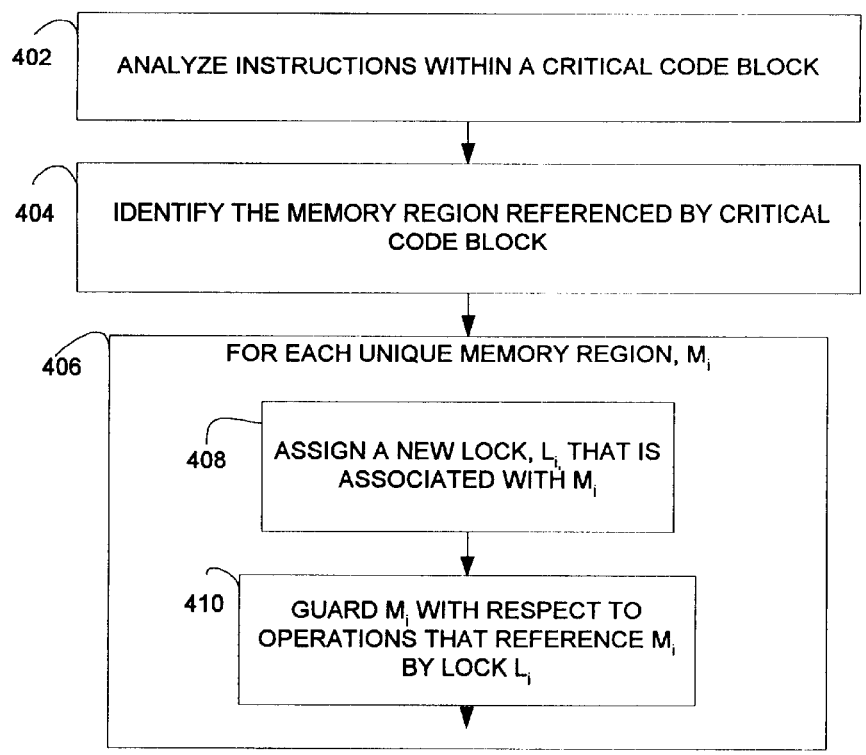
FIG. 4 is a flow diagram that illustrates the manner of operation of the lock re-structuring tool.

FIG. 4 is a flow diagram that illustrates the manner of operation of the lock re-structuring tool 102 (as shown in FIG. 2). Therefore, as shown in element 402 the lock re-structuring tool 102 analyzes instructions 208 within a critical code block 222 (as are shown in FIG. 2). Thereby the lock re-structuring tool 102 identifies the memory region 107 (as shown in FIG. 1A) referenced by the accessed critical code block 222 as shown in element 404.

As shown in element 406 each unique memory region 107 here labeled $M_i$ is associated with the operation of the lock re-structuring tool 102. A new lock structure 228 here labeled $L_i$ is assigned which is associated with the memory region 107 labeled $M_i$, as shown in element 408. Then as shown in element 410, the memory region 107 labeled $M_i$ is guarded by the lock structure 228 labeled $L_i$, with respect to operations that reference the memory region 107 labeled $M_i$.

More particularly, a critical code block 222 that is associated with a thread 226 (as shown in FIG. 2) references a region of the memory 107, and the lock re-structuring tool 102 uses information about the reference to a region of the memory 107 to establish a new lock structure 228. Thereby the present embodiment improves the efficiency of the use of computer memory 106 (as shown in FIG. 1A).

Alternative Embodiments

The foregoing description, for purposes of explanation, used specific nomenclature to provide a thorough understanding of the invention. However, it will be apparent to one skilled in the art that the specific details are not required in order to practice the invention. In other instances, well known devices are shown in block diagram form in order to avoid unnecessary distraction from the underlying invention. Thus, the foregoing descriptions of specific embodiments of the lock re-structuring tool are presented for purposes of illustration and description. They are not intended to be exhaustive or to limit the invention to the precise forms disclosed, many modifications and variations are possible in view of the above teachings. Those skilled in the art will recognize that changes may be made in form and detail without departing from the scope of the invention. The invention is limited only by the claims.

What is claimed is:

1. A computer implemented method for efficient access to computer memory, said computer memory being accessed by a first instruction and a second instruction generated from a computer readable medium encoded in a source program that executes on said computer, said method comprising:

identifying a first memory region in said computer memory referenced by said first instruction;

identifying a second memory region in said computer memory referenced by said second instruction;

identifying a lock for said first and second memory regions; and re-structuring said lock into a first lock for said first memory region and a second lock for said second memory region, said first lock and said second lock replace said lock, thereby efficiently accessing said computer memory.

2. The computer implemented method as set forth in claim 1, further comprising: including said first and second instructions in an emulator and thereby efficiently accessing said computer memory during emulation.

3. The computer implemented method as set forth in claim 1, further comprising: including said first instruction in a critical code block that stipulates sequencing of said first instruction execution, and thereby efficiently accessing said computer memory while executing said first instruction in said stipulated sequence.

4. The computer implemented method as set forth in claim 1, further comprising: executing said first and second instructions under direction of a thread and thereby efficiently accessing said computer memory from said thread.

5. The computer implemented method as set forth in claim 1, further comprising: acquiring and releasing said first lock independent of said second lock.

6. A lock re-structuring apparatus for efficient access to memory in a computer, said memory being accessed by a first instruction and a second instruction generated from a computer readable medium encoded in a source program that executes on said computer, said apparatus comprising:
- a first memory region in said memory referenced by said first instruction;
- a second memory region in said memory referenced by said second instruction; and
- a lock for said first and second memory regions being re-structured into a first lock for said first memory region and a second lock for said second memory region, said first lock and said second lock replace said lock, thereby efficiently accessing said memory.

7. The apparatus of claim 6, further comprising: an emulator that includes said first and second instructions thereby efficiently accessing said memory during emulation.

8. The apparatus of claim 6, further comprising: a critical code block that includes said first instruction and that stipulates sequencing of said first instruction execution thereby efficiently accessing said memory while executing said first instruction in said stipulated sequence.

9. The apparatus of claim 6, further comprising: a thread that directs execution of said first and second instructions thereby efficiently accessing said memory from said thread.

10. The apparatus of claim 6, wherein said first lock and said second lock are independently acquired and released.

11. An article of manufacture comprising a program storage medium having computer readable code embodied therein for efficient access to computer memory, said computer readable code including a first instruction and a second instruction that execute on said computer and that access said computer memory, said article of manufacture comprising:
- computer readable program code for identifying a first memory region in said computer memory referenced by said first instruction and a second memory region in said computer memory referenced by said second instruction; and
- computer readable program code for identifying a lock to said first and second memory regions and for re-structuring said lock into a first lock for said first memory region and a second lock for said second memory region, said first lock and said second lock replace said lock, thereby efficiently accessing said computer memory.

12. The article of manufacture of claim 11, further comprising: computer readable program code for including said first and second instructions in an emulator and thereby efficiently accessing said computer memory during emulation.

13. The article of manufacture of claim 11, further comprising: computer readable program code for including said first instruction in a critical code block that stipulates sequencing of said first instruction execution, and thereby efficiently accessing said computer memory while executing said first instruction in said stipulated sequence.

14. The article of manufacture of claim 11, further comprising: computer readable program code for executing said first and second instructions under direction of a thread and thereby efficiently accessing said computer memory from said thread.

15. The article of manufacture of claim 11, further comprising: computer readable program code for acquiring and releasing said first lock independent of said second lock.

16. A computer readable memory device encoded with a data structure for efficient access to memory in a computer, said memory being accessed by a first instruction and a second instruction that execute on said computer, said computer readable memory device comprising:
- a first memory region being referenced by said first instruction;
- a second memory region being referenced by said second instruction; and
- a lock to said first and second memory regions being re-structured into a first lock for said first memory region and a second lock for said second memory region, said first lock and said second lock replace said lock, thereby efficiently accessing said computer memory.

17. The computer readable memory device of claim 16, further comprising: an emulator that includes said first and second instructions thereby efficiently accessing said memory during emulation.

18. The computer readable memory device of claim 16, further comprising: a critical code block that includes said first instruction and that stipulates sequencing of said first instruction execution thereby efficiently accessing said memory while executing said first instruction in said stipulated sequence.

19. The computer readable memory device of claim 16, further comprising: a thread that directs execution of said first and second instruction entries instructions thereby efficiently accessing said memory from said thread.

20. The computer readable memory device of claim 16, wherein said first lock and said second lock can be independently acquired and released.

\* \* \* \* \*

UNITED STATES PATENT AND TRADEMARK OFFICE
CERTIFICATE OF CORRECTION

PATENT NO. : 6,789,253 B1
DATED : September 7, 2004
INVENTOR(S) : Mark Streich et al.

Page 1 of 1

It is certified that error appears in the above-identified patent and that said Letters Patent is hereby corrected as shown below:

Column 14,
Line 44, after "second" delete -- instruction entries --

Signed and Sealed this

Fourteenth Day of June, 2005

JON W. DUDAS
*Director of the United States Patent and Trademark Office*